United States Patent

Zito, Jr.

[15] 3,640,770

[45] Feb. 8, 1972

[54] RECHARGEABLE METAL HALIDE BATTERY

[72] Inventor: Ralph Zito, Jr., Westford, Mass.

[73] Assignee: The Zito Company, Inc., Derry, N.H.

[22] Filed: Oct. 20, 1969

[21] Appl. No.: 867,799

[52] U.S. Cl.....................................................136/6, 136/30
[51] Int. Cl. ...................................................H01m 35/00
[58] Field of Search.....................136/6, 30, 83, 86, 154–155, 136/121–122, 22, 100, 103

[56] References Cited

UNITED STATES PATENTS

| | | | |
|---|---|---|---|
| 3,328,202 | 6/1967 | Riffe | 136/30 X |
| 3,382,102 | 5/1968 | Zito, Jr. | 136/30 |
| 3,320,093 | 5/1967 | Harding et al. | 136/122 |
| 3,285,781 | 11/1966 | Zito, Jr. | 136/6 X |
| 3,408,232 | 10/1968 | Blue et al. | 136/30 |
| 2,853,444 | 9/1958 | Pye et al. | 204/108 |

*Primary Examiner*—Anthony Skapars
*Attorney*—E. H. Kent

[57] ABSTRACT

A rechargeable metal halide battery, in which a salt of an electroplatable metal and a halogen selected from the class consisting of chlorine, bromine and iodine is electrolyzed from solution in a liquid medium during the charging cycle and reformed during the discharging cycle, the battery comprising at least one electrode comprising an electrically conductive corrodible element and a barrier layer along one side of the corrodible element, the barrier layer being substantially inert and impermeable to halogen in concentrations present in the battery, substantially impermeable to the liquid medium, and having a volume resistivity, $\rho$, such that $\rho d$ is not greater than about 0.1 ohm-in.$^2$, where $d$ is the thickness of the barrier layer, the electrode having a total interface resistance, per square inch of electrolyte-contacting surface, not greater than about 0.05 ohms.

30 Claims, 3 Drawing Figures

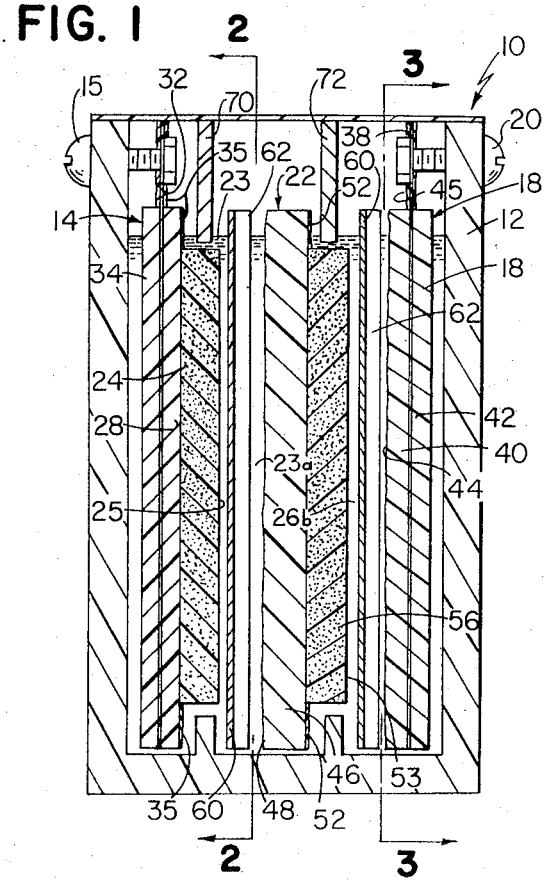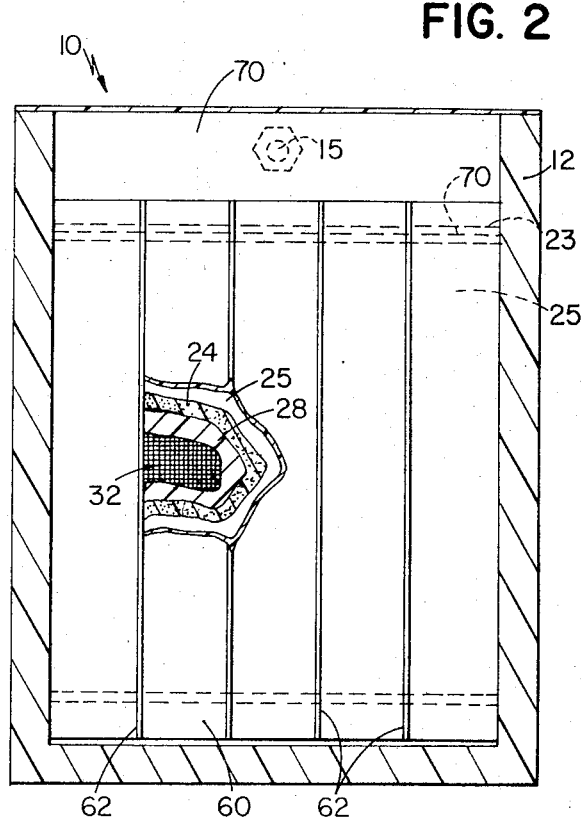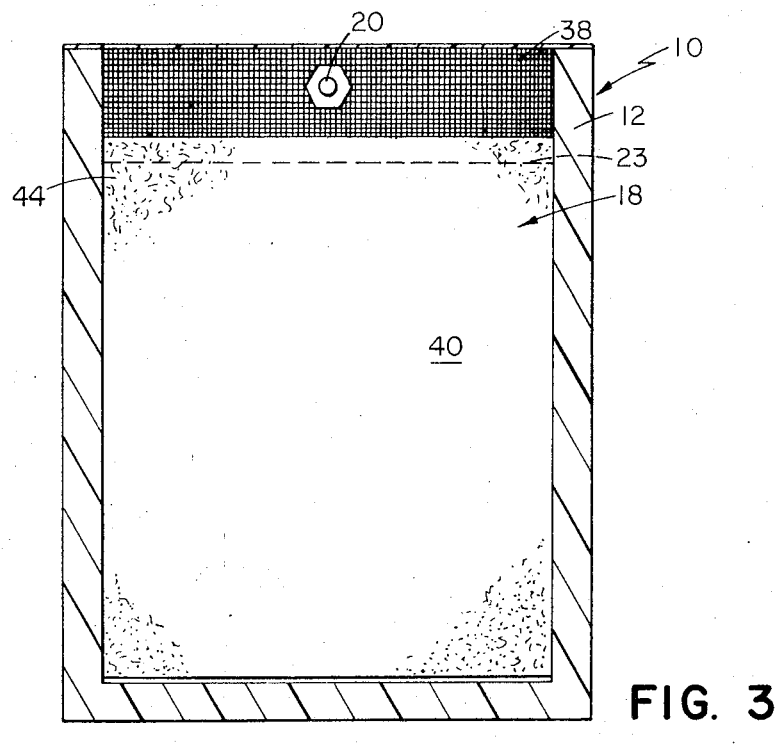

3,640,770

RECHARGEABLE METAL HALIDE BATTERY

This invention relates to secondary batteries and battery components.

One object of this invention is to provide inexpensive, rechargeable, reliable, high-capacity energy cells.

Another object is to provide improved batteries of simple, economical construction having a high watt-hours/pound output, and reasonable charge and discharge times.

Another object is to provide improved batteries which operate at ambient temperatures and pressures, for running moderate power devices, such as lawn mowers and other garden tools, "power tools," small electric vehicles (e.g., golf carts), and the like.

A further object is to provide a metal halide battery which is safe and reliable, has an energy output at least comparable to alkaline-type batteries, and yet is lightweight, durable, and relatively maintenance-free.

Still another object is to provide a safe, economical, and simple zinc bromide battery.

The invention features a rechargeable metal halide battery, in which a salt of an electroplatable metal and a halogen selected from the class consisting of chlorine, bromine and iodine is electrolyzed from solution in a liquid medium during the charging cycle and reformed during the discharging cycle, the battery comprising at least one electrode comprising an electrically conductive corrodible element and a barrier layer along one side of the corrodible element, the barrier layer being substantially inert and impermeable to halogen in concentrations present in the battery, substantially impermeable to the liquid medium, and having a volume resistivity, $\rho$, such that $\rho d$ is not greater than about 0.1 ohm-in.$^2$, where $d$ is the thickness of the barrier layer, the electrode having a total interface resistance, per square inch of electrolyte-contacting surface, not greater than about 0.05 ohms.

A preferred electrode has a barrier layer comprising highly electroconductive carbon particles (e.g., graphite and carbon black) and a bonding agent which is substantially inert and impermeable to halogen in concentrations present in the battery adhered to a metal conductive element. For use as a cathode, the electrode preferably includes additionally a halogen entrapment layer bonded to the barrier layer which is inert to halogen in concentrations present in the battery and comprises a halogen entrapping substance. For use as an anode, the electrode has an electroplating surface provided by the barrier layer, and this surface is preferably rough so as to provide a large number of electroplating sites.

In a preferred metal halide battery, two such electrodes are provided to function as end electrodes (e.g., as the sole electrodes in a single-cell battery), one a cathode including a halogen entrapment layer and the other an anode having an electroplating surface on the barrier layer, the end electrodes providing means for connecting the battery to external electrical equipment. If the battery is to be bipolar, composite electrodes may be located between the end electrodes. Each composite electrode preferably includes an electrically conducting portion (e.g., of highly electroconductive carbon particles and a halogen-inert bonding agent), having a resistivity, $\rho$, such that $\rho d$ is not greater than about 0.1 ohm-in.$^2$, where $d$ is the thickness of the conducting portion, the conducting portion having an electroplating surface on one side, and a halogen entrapment portion bonded to the other side of the conducting portion, the entrapment portion having characteristics identical to those of the entrapment layer of the end cathode.

The end and composite electrodes are preferably constructed so that the projected area of each cathode surface, projected across the battery onto the adjacent electroplating anode surface, is less than the cross-sectional area of the electroplating surface. Thus, peripheral areas of the electroplating surface, which do not face any cathode surface, will be effectively removed from the main electrical path through the battery. Metal deposition can then be confined to interior portions of the electroplating surfaces, and plating along the edges of the anode substantially prevented. The effective cross-sectional area of the cathode may be defined, e.g., by actually constructing the cathode to have such an area, by masking peripheral portions of the cathode with electrical-insulating material, or by constructing the battery casing to have structure projecting between the cathode and the anode. Preferably, a porous separator is placed between adjacent cathode and anode surfaces to lessen the tendency of halogen to migrate from the halogen-entrapment layer of the cathode to the anode.

Where the halogen is bromine (with which a preferred electroplatable metal is zinc), a preferred entrapping substance is a bromine-adsorbent, such as activated carbon. A bonding agent for the barrier and entrapment layers of the end electrodes, useful with bromine, is a polymer both inert and impermeable to bromine in concentrations present in the battery and selected from the class consisting of polyfluorocarbons, polychlorofluorocarbons (e.g., polymonochlorotrifluoroethylene), polymers of monomers containing a major portion of vinylidene chloride, poly (vinyl chloride), and poly (methyl methacrylate). Since the entrapment layer bonding agent need not be bromine-impermeable, inasmuch as the barrier layer is bromine-inert, polyethylene and polypropylene may be used. For the composite electrode, any of the above-described bonding agents, including somewhat bromine-permeable bonding agents, may be used. For each end or composite electrode, it is preferable, where possible (i.e., except when the entrapment layer bonding agent is bromine-permeable), that identical bonding agents be utilized in the entrapment and barrier layers, or the entrapment and conducting portions.

In another aspect, the invention features an electrode for an aqueous zinc bromide battery comprising an electrically conductive metallic element and a barrier layer, along the metallic element, the barrier layer consisting, by weight, of at least about 25 percent highly electroconductive carbon particles (e.g., graphite or carbon black) and the remainder by weight of a polymeric bonding agent therefor, the bonding agent being substantially inert and impermeable to bromine in concentrations present in the battery, and the barrier layer being substantially impermeable to bromine and water. Where a cathode, the electrode also includes a bromine-adsorbent layer, bonded to the barrier layer, consisting, by weight, of a major portion of activated carbon particles and a minor portion of a polymeric bonding agent therefor, the bonding agent being substantially inert to bromine in concentrations present in the battery; this adsorbent bromine layer permits the flow of electricity between the electrolyte and barrier layer and has a bromine adsorptivity of at least about 0.5 grams of bromine per gram of adsorbent layer. This electrode, whether anode or cathode, preferably has all portions of the metallic element masked both from bromine and electrolyte by the barrier layer and, where required, by an additional protective film which is impermeable to either or both of bromine and the electrolyte, and is formed of bromine-inert material (e.g., comprises one of the aforesaid polymeric bonding agents).

A preferred metallic element has apertures (e.g., is a screen) so that it may be sandwiched between a barrier and a protective layer, which are bonded to each other through the apertures in the metal. For such a construction, it is preferred that an identical bonding agent be used in the barrier layer and in the protective layer.

Other objects, features and advantages will appear to one skilled in the art from the following description of preferred embodiments of the present invention, taken together with the attached drawings thereof, in which:

FIG. 1 is a sectional view of a schematic illustration of a battery embodying the present invention;

FIG. 2 is a sectional view, partially broken away, of the battery of FIG. 1, along line 2—2 thereof; and, FIG. 3 is another sectional view of the battery of FIG. 1, along line 3—3 thereof.

The figures show a battery 10 having an outer case 12, an end (battery) cathode 14 electrically connected to cathode terminal screw 15, an end (battery) anode 18 electrically connected to anode terminal screw 20, one intermediate composite electrode 22, and a liquid electrolyte medium 23.

Referring to FIG. 2, end cathode 14 includes a halogen-entrapment (e.g., halogen-adsorbent) layer 24, having an extended surface 25 in contact with electrolyte 23, and bonded, along its opposite surface, to barrier layer 28, which is substantially impermeable both to halogen (by "halogen" is meant chlorine, bromine, and iodine, but not fluorine) and to electrolyte. Halogen-entrapment layer 24 is substantially inert to halogen but preferably somewhat halogen-permeable. Metal screen 32 is sandwiched between barrier layer 28 and a protective layer 34, the two layers preferably being bonded to one another through the apertures in screen 32. Protective layer 34 is substantially inert and impermeable to halogen, as well as impermeable to electrolyte.

Barrier layer 28 should be capable of conducting electricity between entrapment layer 24 and metal screen 32, and thus should have a resistivity, $\rho$, and thickness, $d$, such that $\rho d$ is equal to or less than about 0.1 ohm-in.$^2$. Halogen-entrapment layer 24 preferably permits the flow of electricity between electrolyte and barrier layer, where relatively fast battery charge and discharge times are desired. Exposed portions of barrier layer 28 and screen 32 may be coated with a protective film, 35, which is also substantially inert and impermeable to halide as well as impermeable to electrolyte, and is an electrical insulator.

End anode 18 has a metal screen 38 sandwiched between an anode barrier layer 40 and an anode protective layer 42, which have properties identical, respectively, to cathode screen 32, barrier layer 28, and protective layer 34. Anode barrier layer 40 has a roughened surface 44 (e.g., sandblasted) in contact with the electrolyte providing a metal electroplating surface. Exposed portions of screen 38 are coated with a protective film 45, which is inert and impermeable to bromine and to electrolyte.

Composite electrode 22 has a substantially halogen-inert conducting portion 46, including on one side a roughened electroplating surface 48 (like electroplating surface 44 of anode 18) and, bonded to its opposite side, a halogen-entrapment (e.g., halogen-adsorbent) portion 50, also substantially inert to halogen, and a protective electrical insulator film 52, which may be identical to protective film 33. Halogen-entrapment portion 50 has an extended surface 53 in contact with electrolyte 23. Conducting portion 46 should have a combined resistivity, $\rho$, and thickness, $d$, such that $\rho d$ is less than or equal to about 0.1 ohm-in.$^2$. Entrapment portion 50 should permit flow of electricity between the electrolyte and conducting portion 50.

Porous separators 60, having spaced vertical ribs 62, are located between each adjacent anodic and cathodic surface, and retard the tendency of halogen molecules to migrate to the anode, thereby improving the charge retentivity of the battery. Since halogen-entrapment surfaces 25, 53 are of smaller cross-sectional area that the adjacent anodic, electroplating surfaces 48, 44, respectively, very little metal will be electroplated near the edges of the electroplating surfaces. Protective films 35 and 52, made of electrical insulating material, further confine the effective areas of the cathode. Case 12 may be constructed with horizontally extending electrical insulating barriers 70, 72 which will even further limit the effective cathode area.

In order to ensure an adequate battery output, the interface resistance for each total cathode or anode electrolyte-contacting surface (whether for an end or for a composite electrode) should be, per square inch of electrolyte-contacting area, not greater than about 0.05 ohms. Thus, for composite electrode 22, the total interface resistance across the electrode from electrolyte region 23$a$ to electrolyte region 23$b$ should not be greater, per square inch of electrolyte contacting area, than about 0.10 ohms.

The electrolyte includes a liquid medium having a dissolved salt of a halide and an electroplatable metal which is electrolyzed during the charging cycle of the battery (i.e., by connecting a voltage source across the battery to terminal screws 15 and 20), the metal electroplating on the anode electroplating surfaces, and the halide forming a molecular halogen, which is substantially entrapped within the halogen-entrapment layer or portion. The halogen-entrapping material should preferably form bonds with halogen molecules of sufficient energy to keep the halogen molecules near the cathode during charging and charged periods, yet of low enough energy so as not to interfere with ionization of halogen during the discharge cycle.

The halogen may be chlorine, bromine, or iodine. In general, the metal should be repeatedly electroplatable and must not be corroded in the liquid electrolyte medium, and the metal halide salt must be sufficiently soluble in the liquid medium to be electroplatable. Where an aqueous liquid medium is employed, among the useful metals are, e.g., zinc, nickel, cadmium, tin, lead, and copper. In a nonaqueous electrolyte medium, such as may be utilized for chlorine, even water-unstable, reactive metals, such as sodium, potassium and lithium may be used in addition to the above-listed metals, with suitably metal-inert bonding agents.

A preferred electrolyte is zinc bromide in an aqueous solution. This salt has a reasonably high potential of 1.83 volts, is highly soluble in water to provide a low resistivity electrolyte, and has a calculated free energy per pound of about 200 watt-hours. The molarity of the electrolyte solution during charging and discharging is preferably between about 0.5 to 9, (more preferably, not more than about 7). The electrolyte is, of course, at its lowest molarity at full charge, and its highest at full discharge. Preferably, at full charge, substantially all free bromine in the battery is entrapped.

In the end cathode, for entrapping bromine, a preferred entrapment layer consists of bromine-adsorbent activated carbon particles, bonded together by a bonding agent which is inert to bromine in concentrations present in the battery. Thus, bonding agents which might be degraded by concentrated bromine (liquid), such as polymers having a major portion of vinylidene chloride, are nonetheless useable as an activated carbon bonding agent, so long as the concentrations of bromine produced in the battery remain below those capable of degrading the bonding agent. In general, when employing degradable polymers or copolymers of vinylidene chloride or vinyl chloride, the maximum bromine concentration in the adsorbent layer should not exceed about 0.5M. The bonding agent should preferably merely bond the activated carbon particles together, without flowing into the adsorbent pores thereof, and should be present in the minimal amount required to give structural integrity to the adsorbent layer. Preferably, the adsorbent layer adsorbs at least half its weight of bromine, and, more preferably an amount of bromine equal to or even greater than its weight.

Among the sufficiently bromine-inert bonding agents suitable in the adsorbent layer are, e.g., the polyfluorocarbons, such as polytetrafluoroethylene ("Teflon," available from E. I. du Pont de Nemours & Co.), poly (vinylidene fluoride) ("Kynar," available from Penwalt Co.), polymonochlorotrifluoroethylene ("CTFE," available from Allied Chemical Co.), and "FEP," a fluorinated polyethylene available from the same du Pont; poly (vinyl chloride) homopolymers (plasticized or unplasticized) (e.g., "Geon 222," available from B. F. Goodrich Co.); poly (vinylidene chloride) homopolymers and copolymers (50 percent or greater vinylidene chloride) such as acrylonitrile and vinyl chloride copolymers (available generally under the trade name "Saran" from Dow Chemical Co.); polymethacrylates such as poly (methyl methacrylates) ("Plexiglas," available from Rohm & Haas Co.); and polyalkylenes such as polyethylene and polypropylene.

The adsorbent layer may be prepared by conventional methods, such as by admixing the polymeric bonding agent and activated carbon particles in a liquid medium which is thereafter evaporated, or by sintering, or by molding.

A preferred barrier layer, for use in a metal bromide battery, consists of highly electroconductive carbon particles (e.g., graphite or carbon black) bonded together by a bonding agent which is both inert and impermeable to bromine, as well as impermeable to electrolyte, so as to protect the metal connector (e.g., screen 32 or 38) beneath from the corrosive effects of bromine, salt, and water, while allowing passage of electricity between the metal and the electrolyte. The metal substrate is typically copper or a similar highly conductive, yet corrodible metal.

The barrier layer bonding agent may, therefore, be any of the bonding agents previously listed for forming the adsorbent layer, except the polyalkylenes which are somewhat too permeable to bromine. Where bromine-degradable polymers, such as the vinyl chloride and vinylidene chloride polymers are employed, the maximum bromine concentration at the barrier layer should not exceed about 0.5 M. Preferably, an identical or similar bonding agent is used in the adsorbent layer and in the barrier layer, so that a good bond may be achieved between the layers. Where a polyalkylene is used in the adsorbent layer, a vinylidene chloride homo- or copolymer, e.g., may be utilized in the barrier layer. The protective layer, as well as the various protective films, for use in a zinc bromide battery, may be constructed similarly to the barrier layer, or may consist simply of a film of any of the bonding agents utilized to bond the highly electroconductive carbon particles of the barrier layer together. Preferably, to obtain a good bond through the metal screen, the bonding agent in the protective layer is identical to that in the barrier layer. The protective layer should also be impermeable to electrolyte.

The corrodible electrically conducting element is, e.g., a metal sheet, and enclosed in an envelope of bromine-inert and impermeable, and electrolyte-impermeable material, such as a barrier layer and a protective layer sealed to one another around the periphery of the sheet, and, in an end electrode, must have a portion connectable (e.g., protruding from the battery) to an external electrical circuit. Preferably, the metal sheet has apertures (e.g., is a screen) so that the protective and barrier layers are bonded at spaced portions of the metal sheet.

For use in a metal bromide battery, a preferred end anode has a barrier layer of highly electroconductive carbon particles (e.g., graphite or carbon black) bonded together by one of the same group of bonding agents utilized to make the end cathode barrier layer, and has a protective layer bonded through a metal sheet, such as a screen, to the barrier layer, and formed in the same manner described for the cathode protective layer. The surface of the barrier layer which is in contact with the electrolyte is roughened, e.g., by sandblasting, to form an irregular surface which thereby provides a great many "sites" for starting electroplating of the metal, such as zinc. The metal also is thereby adhered better to the anodic surface, resulting in better charge retentivity for the battery. In addition, uniform metal deposition is enhanced, lessening the possibility of excessive dendrite growth, as well as ensuring a complete and reproducible discharge cycle for the battery.

The entrapment portion of the composite electrode (or electrodes, the number depending on the voltage level desired for the battery) may, again, for a metal bromide battery, be composed of adsorbent activated carbon particles bonded together by a suitable substantially bromine-inert bonding agent, such as listed above for the barrier layer of the end cathode. The "conductive portion" is composed of highly electroconductive carbon particles (e.g., graphite or carbon black) bonded together with one of the same group of bonding agents utilized in the entrapment portion. Where, as shown in the illustrated embodiment, the composite electrode has no metal element, the somewhat bromine-permeable polyalkylenes are useful in the conductive portion, particularly where the required charge retention time is sufficiently low (e.g., in the order of days) so that the rate of permeation of significant bromine through to the electroplating surface of the anode is so slow as to be negligible during the desired charge retention time. Where larger charge retention is desired (as when a "trickle" discharge battery is desired), then less bromine-permeable materials such as the polymeric fluorocarbons and chlorofluorocarbons, vinyl chlorides, vinylidene chlorides (homo- and copolymers) and methacrylates are preferred. Preferably, for good cohesion between the two portions of the composite electrode, the two bonding agents used in the two composite electrode portions are identical.

The separator 60 must have sufficient porosity to allow free passage therethrough of electrolyte, yet not be so porous as to present no obstacle to free passage therethrough of bromine molecules. The pores may be of substantially larger size than bromine molecules, and still present some impedance to, although not prevent entirely, passage of bromine molecules. One useful separator material is a porous (pores in the range of 200 to 500 Angstroms in diameter) polyethylene separator, structured as shown in the figures, having a thickness of about 1/32 inch. Dialysis membranes (e.g., having pore sizes in the order of 50 Angstroms) are also useful.

Iodine being less reactive than bromine, all of the bonding agents listed for bromine are sufficiently inert to iodine for use as bonding agents in forming barrier and entrapment layers for metal iodine batteries, whereas at least the polyfluorocarbons and polychlorofluorocarbons are suitable bonding agents for metal chloride batteries.

A preferred material for making the battery case is 3/16 inch poly (methyl methacrylate). The frame may be cemented to the cathodes using a polymeric material similar so that used for making the electrodes. For example, a "Saran" cement (e.g., a mixture of "Saran–130" resin, poly (methyl methacrylate) and a suitable solvent) is particularly useful for "Saran" or "Plexiglas" electrodes.

An illustrative method for preparing a battery in accordance with the present invention will now be described, utilizing poly (monochlorotrifluoroethylene). This method is generally applicable to other bonding agents, with the relative amounts of materials and molding temperatures suitably adjusted to provide electrodes having both the required resistivities and adsorptivities, as well as mechanical integrity.

To prepare a barrier sheet useful as a barrier layer, 70 grams of "CTFE," a commercially available polymonochlorotrifluoroethylene (available from Allied Chemical Co.) was mixed in a blender for 10 minutes with 30 grams of highly electroconductive graphite particles (Dixon No. 1112). The mixture was introduced into a 6 × 9 inches × ⅛ inch frame, and trowelled until level. The frame was placed in a mold formed of two platens, heated for 1 minute at 530° F., and clamped between the platens under 30 tons of pressure for 5 minutes. The pressure was then released, and the frame cooled between cold platens under 30 tons of pressure (for approximately 5 minutes); the resultant (about 20 mils thick) sheet had a $pd$ of less than 0.1 ohm-in.$^2$.

A copper substrate was prepared from a 5 mil copper sheet, 3 and ¾ inches by 8 inches, having 40 and one-eighth inch holes therethrough, both surfaces sandblasted, and the entire sheet cleaned in a 0.1N solution of hexionic acid. If a copper screen is used, it should also be cleaned in hexionic acid, and preferably prestraightened in a mold between cold platens at a pressure of 30 tons.

Two "CTFE" barrier sheets, prepared as described, were cut so as to provide an approximately one-half inch border around the entire periphery of the copper sheet, and these two CTFE sheets, with the copper sheet placed therebetween and totally encased within the CTFE sheets, were placed in the mold, heated for one minute at 530° F., held for 5 minutes under 30 tons, and cooled in the mold for 5 minutes under 30 tons. The resultant sheet, with the copper encased between the laminated CTFE sheets, was left in the mold, and there was trowelled onto this sheet 26.5 grams of a mixture, ball milled for 14 minutes, of 90 percent by weight activated carbon (Barneby Cheney UU grade) and 10 percent by weight of "CTFE." The mixture was heated at 490° F. in the mold for 2 minutes, pressed under 5 tons pressure for 10 minutes, and then cooled in the mold with the pressure maintained.

An anode was prepared by laminating a copper sheet between two graphite-loaded CTFE barrier sheets, made as described, and thereafter sandblasting one surface of the resultant anode.

A composite electrode was prepared by producing a graphite-loaded CTFE barrier sheet, made as described, in the mold, adding 26.5 grams of the above-described mixture of activated charcoal and CTFE onto the sheet, and pressing the mixture together between hot platens as described for making the cathode.

A single cell battery was constructed, utilizing the above described CTFE end cathode and end anode, separated by a single porous polyethylene separator. The total surface resistance across any one of the two electrolyte-contacting surfaces was, per square inch, with a 3.5 (full discharge) molar solution of zinc bromide in water as an electrolyte, not greater than about 0.05 ohms. The single-cell battery was cycled more than 100 times, and had a total capacity of about 6 to 8 watt-hours (about 20 to 27 watt-hours/lb).

Other embodiments will occur to those skilled in the art.

What is claimed is:

1. A rechargeable metal halide battery, in which a salt of an electroplatable metal and a halogen selected from the group consisting of chlorine, bromine, and iodine, is electrolyzed from solution in a liquid electrolyte medium during the charging cycle and reformed during the discharging cycle, comprising an electrode suitable for connection to an external electrical circuit to charge and discharge said battery comprising
    an electrically conductive element, corrodible by said halogen, for connection to said circuit, and
    a separate barrier layer, for conducting current between said corrodible element and said liquid electrolyte medium, said barrier layer being secured along one side of said corrodible element to separate said element from said liquid electrolyte medium, said barrier layer being inert and impermeable to said halogen in concentrations present in said battery, impermeable to said liquid medium, and having a volume resistivity, $\rho$, such that $\rho d$ is not greater than about 0.1 ohm-in.$^2$, where d is the thickness of the barrier layer,
    said electrode having a total interface resistance, per square inch of electrolyte-contacting surface area, not greater than about 0.05 ohms.

2. A battery according to claim 1 wherein said barrier layer comprises highly electroconductive carbon particles and a bonding agent inert and impermeable to halogen in concentrations present in said battery.

3. A battery according to claim 2 wherein said halogen is bromine, and said bonding agent is a polymer inert and impermeable to bromine in concentrations present in said battery, selected from the class consisting of polyfluorocarbons, polychlorofluorocarbons, polymers of monomers containing a major portion of vinylidene chloride, poly (vinyl chloride), and poly (methyl methacrylate).

4. A battery according to claim 3 wherein said polymer is polymonochlorotrifluoroethylene.

5. A battery according to claim 1 wherein said electrode is a cathode and comprises a halogen entrapment layer, inert to halogen in concentrations present in said battery and comprising a halogen entrapping substance.

6. A battery according to claim 5 wherein said halogen is bromine and said halide entrapment layer comprises bromine absorbent particles and a bonding agent for securing said particles into an integral layer, said bonding agent being inert to bromine in concentrations present in said battery, said layer having a bromine adsorptivity of at least about 0.5 g. of bromine per gram of said layer.

7. A battery according to claim 6 wherein said bonding agent is a polymer inert and impermeable to bromine, selected from the class consisting of polyfluorocarbons, polychlorofluorocarbons, polymers of monomers containing a major portion of vinylidene chloride, poly (vinyl chloride), poly (methyl methacrylate), polyethylene, and polypropylene.

8. A battery according to claim 7 wherein said polymer is polymonochlorotrifluoroethylene.

9. A battery according to claim 6 wherein said bromine adsorbent is activated carbon.

10. A battery according to claim 1 wherein said electrode is an anode, and said barrier layer provides an electroplating surface for said metal.

11. A battery according to claim 10 wherein said electroplatable metal is zinc and said electroplating surface has a rough texture providing a large number of electroplating sites for said metal.

12. A battery according to claim 1 wherein said electrically conductive corrodible element is formed of metal.

13. A battery according to claim 1 comprising cathodic and anodic electrodes including at least two said electrodes having said corrodible electrically conductive element and said barrier layer wherein
    one said electrode is a cathode comprising additionally a halogen entrapment layer, inert to halogen in concentrations present in said battery, bonded to said barrier layer, and comprising a halogen-entrapping substance, and
    the other said electrode is an anode,
    each cathodic electrode having an extended surface adapted to be located adjacent said liquid electrolyte medium,
    and each said anodic electrode having an electroplating surface for said metal, parallel to the adjacent extended cathode surface.

14. A battery according to claim 13 wherein the projected cross-sectional area of each extended cathode surface, projected across said battery onto the adjacent electroplating surface, is less than the cross-sectional area of said electroplating surface.

15. A battery according to claim 14 wherein the actual cross-sectional area of each extended cathode surface is less than the cross-sectional area of the adjacent electroplating surface.

16. A battery according to claim 14 including structure projecting between an extended cathode surface and an adjacent anode electroplating surface such that the projected cross-sectional area of the said extended cathode surface across said battery onto said adjacent electroplating surface is less than the actual cross-sectional area of the said extended cathode surface.

17. A battery according to claim 14 including a layer of electrical-insulating material along peripheral portions of an extended cathode surface to limit said extended surface to said projected cross-sectional area.

18. A battery according to claim 13 including a porous separator element between adjacent cathode and anode surfaces, whereby the tendency of halogen to migrate from said cathode to said anode is lessened.

19. A battery according to claim 13 wherein said battery includes at least one composite electrode intermediate of said anode and said cathode, said composite electrode comprising
    an electrically conductive portion inert to halogen in concentrations present in said battery, having a resistivity, $\rho$, such that $\rho d$ is not greater than about 0.1 ohm-in.$^2$, where d is the thickness of said element, and having a surface, facing said end cathode, providing an electroplating surface for said metal, and
    a halogen entrapment portion, bonded to said electrically conductive portion along the surface of said electrically conductive portion opposite said electroplating surface, said entrapment portion being inert to halogen in concentrations present in said battery, comprising a halogen-entrapping substance, and providing an extended surface facing said end anode,
    said composite electrode having a total interface resistance, per square inch of electrolyte-contacting surface areas, not greater than about 0.10 ohms.

20. A battery according to claim 19 wherein said composite electrode electroplating surface has a rough texture providing a large number of electroplating sites for said metal.

21. A battery according to claim 19 wherein said halogen is bromine.

22. A battery according to claim 21 wherein the said electrically conductive portion of said electrode comprises highly electroconductive carbon particles and a bonding agent inert to bromine in concentrations present in said battery, and said halogen-entrapment portion comprises bromine-adsorbent activated carbon particles and a bonding agent for securing said particles into an integral layer, said bonding agent being inert to bromine in concentrations present in said battery, said halogen-entrapment portion having a bromine adsorptivity of at least about 0.5 g. of bromine per gram of said portion.

23. A battery according to claim 21 wherein each said bonding agent is a polymer, to bromine in concentrations present in said battery, selected from the class consisting of polyfluorocarbons, polychlorofluorocarbons, polymers of monomers containing a major portion of vinylidene chloride, poly (vinyl chloride), poly (methyl methacrylate), polyethylene, and polypropylene.

24. A battery according to claim 23 wherein said electrode bonding agents are identical.

25. A battery according to claim 24 wherein said bonding agent is polymonochlorotrifluoroethylene.

26. In a rechargeable metal bromide battery, in which a salt of an electroplatable metal and a halogen selected from the group consisting of chlorine, bromine, and iodine is electrolyzed from solution in a liquid medium during the charging cycle and reformed during the discharging cycle, said battery including an end anode and an end cathode structured to provide external electrical connections for said battery, a composite electrode adapted to be located intermediate of said end anode and said end cathode in voltaic series therewith, said composite electrode comprising an electrically conductive portion comprising highly electroconductive carbon particles and a polymeric bonding agent bonding said particles together, said bonding agent being inert to said halogen in concentrations present in said battery, said conductive portion having a resistivity, $\rho$, such that $\rho d$ is not greater than about 0.1 ohm-in.$^2$, where $d$ is the thickness of said element, and having a surface, facing said end cathode, providing an electroplating surface for said metal, and a separate bromine-adsorbent portion, bonded to said electrically conductive portion along the surface of said electrically conductive portion opposite said electroplating surface, comprising bromine-adsorbent activated carbon particles and a polymeric bonding agent for securing said particles into an integral electrode portion, said bonding agent inert to bromine in concentrations present in said battery, having a bromine adsorptivity of at least about 0.5 g. of bromine per g. of said portion, and providing an extended surface facing said end anode, the bonding agent of said conducting portion and the bonding agent of said adsorbent portion being adherent to one another to bond said portions together, said composite electrode having a total interface resistance, per square inch of electrolyte-contacting surface area, not greater than about 0.10 ohms.

27. A battery according to claim 26 wherein said composite electrode electroplating surface has a rough texture providing a large number of electroplating sites for said metal.

28. A battery according to claim 26 wherein each said bonding agent is a polymer, inert to bromine in concentrations present in said battery, selected from the class consisting of polyfluorocarbons, polychlorofluorocarbons, polymers of monomers containing a major portion of vinylidene chloride, poly (vinyl chloride), poly (methyl methacrylate), polyethylene, and polypropylene.

29. A battery according to claim 28 wherein said electrode bonding agents are identical.

30. A battery according to claim 29 wherein said bonding agent is polymonochlorotrifluoroethylene.

* * * * *

UNITED STATES PATENT OFFICE
CERTIFICATE OF CORRECTION

Patent No. 3,640,770          Dated February 8, 1972

Inventor(s) Ralph Zito, Jr.

It is certified that error appears in the above-identified patent and that said Letters Patent are hereby corrected as shown below:

Col. 3, line 56, change "that" to --than--.

Col. 6, line 30, change "so" to --to--.

Col. 9, line 17, before "to" insert --inert--.

Signed and sealed this 12th day of September 1972.

(SEAL)
Attest:

EDWARD M. FLETCHER, JR.          ROBERT GOTTSCHALK
Attesting Officer                Commissioner of Patents